United States Patent [19]
Shepovalov et al.

[11] 3,907,112
[45] Sept. 23, 1975

[54] AUTOMATIC MACHINE FOR CLASSIFYING EGGS INTO WEIGHT CATEGORIES

[76] Inventors: Vyacheslav Dmitrievich Shepovalov, Staro-Petrovsko Razumovsky proezd, 6, korpus 1, kv. 78; Alexandr Vasilievich Fedorov, ulitsa Akademika Koroleva, 30, kv. 65; Anatoly Grigorievich Puzankov, Beskudnikovsky bulvar, 5, kv. 51; Viktor Alexeevich Khmyrov, Belomorskaya ulitsa, 12, kv. 41, all of, Moscow; Eduard Petrovich Delokas, ulitsa Moskovskaya, 76, korpus 1, kv. 41, Pyatigorsk; Igor Danilovich Agafonov, ulitsa Moskovskaya, 76, korpus 1, kv. 37, Pyatigorsk; Evgeny Ivanovich Bataev, ulitsa Khetagurova, 37, kv. 7; Boris Shugaibovich Khabatov, ulitsa Moskovskaya, 76, korpus 1, kv. 43, Pyatigorsk, U.S.S.R.

[22] Filed: Dec. 27, 1973

[21] Appl. No.: 428,859

Related U.S. Application Data
[63] Continuation of Ser. No. 343,164, March 20, 1973.

[52] U.S. Cl. .............. 209/121; 177/209; 177/254
[51] Int. Cl. .............................................. B07c 5/18
[58] Field of Search ............ 209/121; 177/208, 209, 177/254

[56] References Cited
UNITED STATES PATENTS

| | | | |
|---|---|---|---|
| 3,317,039 | 5/1967 | Wadey | 177/208 |
| 3,371,732 | 3/1968 | Stein | 177/254 |
| 3,620,316 | 11/1971 | Henry | 209/121 |
| 3,643,798 | 2/1972 | Krupofich | 209/121 X |
| 3,680,693 | 10/1970 | Altenpohl et al. | 209/121 |

*Primary Examiner*—Allen N. Knowles

[57] ABSTRACT

A system for classifying eggs according to weight which comprises apparatus incorporating a single weighing device equipped with a weight pick-up and means for determining the respective weight of an egg by a single weighing, including means for generating delay signal pulses and being operatively connected to the output of the weighing device; the delay signal through delay lines being connected to control devices operatively connected to means for directing weight-classified eggs from individual gates along a distribution-conveyor for the individual weight-classified eggs.

8 Claims, 9 Drawing Figures

AUTOMATIC MACHINE FOR CLASSIFYING EGGS INTO WEIGHT CATEGORIES

This is a continuation, of application Ser. No. 343,164, filed Mar. 20, 1973.

FIELD OF THE INVENTION

The invention relates to systems incorporating automatic classifying machines, and more particularly, to systems to automatically classifying eggs according to weight.

BACKGROUND OF THE INVENTION

Known in the art are machines for automatically classifying eggs according to weight. These machines automatically have comprised a feeding conveyor, mechanical weighing devices mounted on a common stand and constructed to provide an adjustable balance respectively operated by different weight eggs, means for transferring eggs from one weighing device to another one, as well as chutes and stops for accumulating the weight classified eggs. The weight classification of eggs is accomplished by successively moving eggs onto the balances, i.e. from one to another. When an egg heavier than the adjusted valve of a particular balance reaches that balance, the weighing device dislodges the egg onto an appropriate branch chute for a particular weight. Each weighing device is classification individually adjusted to a definite rated value which corresponds to some specified egg weight category.

The number of weighing devices each having the same rated value of adjustment determines the number of eggs being simultaneously classified.

The automatic machines of the prior art used to weight classify eggs have a number of disadvantages, One, for example, is that considerable movement of eggs between the differently adjusted balances increases the probability of breakage and places high dynamic loads on the egg embryo;

Another disadvantage is the slow productivity which cannot be substantially increased since an increase in the number of balance and eggs flowing thereto results in increasing routes over which the eggs travels, this reducing efficiency;

One more disadvantage lies in the complexity of fabrication and maintenance, the low reliability in operation, large dimensions of the classifying field of the prior art balancing systems.

SUMMARY OF THE INVENTION

An object of the invention is to provide an automatic machine for weight classifying eggs with means for determining the appropriate weight of each egg during a single weighing procedure, thus eliminating multiple tranferring of eggs successively to devices, reducing speeds and accelerations imparted to the eggs so they do not have to pass onto successive devices and thus reducing the probability of breakage.

Another object of the invention is to provide increased productivity of an automatic egg-weighing or classifying machine which is simple in fabrication and maintenance, and reliable in operation.

In accordance with the above-mentioned and other objects, the present invention is characterized in that the automatic machine for weight classifying eggs comprises feeding and discharging conveyors which transport eggs, a weighing device and a mechanism for transferring eggs constructed to operate pneumatically and including a single weight pick-up and means for determining the relevant specified egg weight classification at a single weighing, the means being operatively connected to the weighing device, a distribution conveyor connected to control means controlled by relay pulses from a signal delay line, the input of each signal delay line being connected to a signal output of the weighing device, and the output signals of the delay lines being operatively connected to a control device of a distribution conveyor, with the number of the said delay signal corresponding to the number of the specified egg-weight classification categories.

According to the invention, the means for determining the egg weight category of the egg by a single weighing procedure consists of a group of comparison units corresponding to the number of specified egg weight categories, each comparison unit including a selector of a reference signal to be determined according to the egg weight category; a comparison unit which compares the signal received from the egg weight pick-up with the signal tranmitted by the selector of the reference signal of a given comparison unit and a pneumatic relay, in combination with the comparison units communicating through a common fluid channel with the output of the egg weight pick-up and having different actuation thresholds, the first comparison unit having the highest actuation threshold, with each subsequent one having an actuation threshold lower than the preceding one, with the comparison unit with the highest actuation threshold being directly connected to the relevant output channel of the egg-weighing device, and a negation device controlled by the output signal of the preceding comparison unit which is connected to the output of each successive comparision unit.

It is preferred to construct the signal delay lines so that each comprises pneumatic relays equal in number to the number of signal delay pulses and that of pneumatic reservoirs, each line being connected to the input of each of the pneumatic relays and connecting it with the output of the preceding pneumatic relay, and the first one of the pneumatic relays of the delay line being connected to the relevant output line of the egg weighing device; each of the delay lines having channels at the input and output to be controlled by the generator of stroke pulses, and the output of the last relay being connected to the output channel of the delay line through a change-over switch controlled from the generator of stroke pulses, and connecting the output channel of the delay line to the atmosphere in the absence of a stroke pulse.

It is also preferred to construct the distribution conveyor in the form of successively-connected cells or units, each of the cells, when a the pneumatic signal from the delay line arrives from an appropriate control device, transferring a weight-classfied egg under the effect of the control device to an appropriate section of the distribution conveyor.

It is also preferred to arrange the discharging conveyer transversely to the distribution conveyor, thus laterally-removing the weight classified eggs from the flow of eggs proceeding to the egg-classifying weight pick-up.

It is also desirable to construct the egg-classifying weight pick-up to include a pivoted swivel lever having one end located over a nozzle and a power compensation constructed in the form of two membranes of varying effective areas connected by a rigid rod which interacts with the pivoted lever, and a chamber formed by the membranes communicating through a channel with the said nozzle and with the output of the egg-classifying weight pick-up.

It is also preferable to construct the comparison elements so that each has one membrane which divides an inner cavity into two chambers and a nozzle installed in one of the chambers, the nozzle interacting with the said membrane and communicating with a control chamber of a pneumatic relay connected to the same comparison unit as the given comparison element, and with the atmosphere through an orifice, the given chamber being connected to the output of the egg-classifying weight pick-up, and the other chamber — to the selector of the reference signal provided by the same comparison unit as the given comparison element.

It is also expedient to construct the comparison elements so that each has two similar membranes interconnected by a rigid rod, the membranes dividing an inner cavity of the comparison element into three chambers, and a nozzle installed in the chamber formed by the said membranes, the nozzle interacting with one of the membranes and communicating with the control chamber of the pneumatic relay connected to the same comparison unit as the given comparison element and through the orifice — to the pneumatic power source, with the chamber separated by the membrane which interacts with the nozzle being connected to the output of the egg-classifying weight pick-up, the chamber formed by the membranes communicates with the atmosphere, and the third chamber connected to the selector of the reference signal, the selector corresponding to the same comparison unit as the given comparison element.

The invention is further explained by examples of embodiments with reference to the accompanying drawings, in which:

DESCRIPTION OF THE PREFERRED EMBODIMENT

The general layout of the automatic machine for weight classifying eggs comprises an egg feeding conveyer 1 (FIG. 1), a weighing device 2, a transfer mechanism 3, a distribution conveyer 4 which receives eggs 5 from the weighing device 2, a discharging conveyer 6, delay signal lines $7_1$, $7_2$, $7_3$, the signals emenating from the weighing device 2 to a differing number of strokes pulses, and a stroke pulse generator 8.

Figure 1:
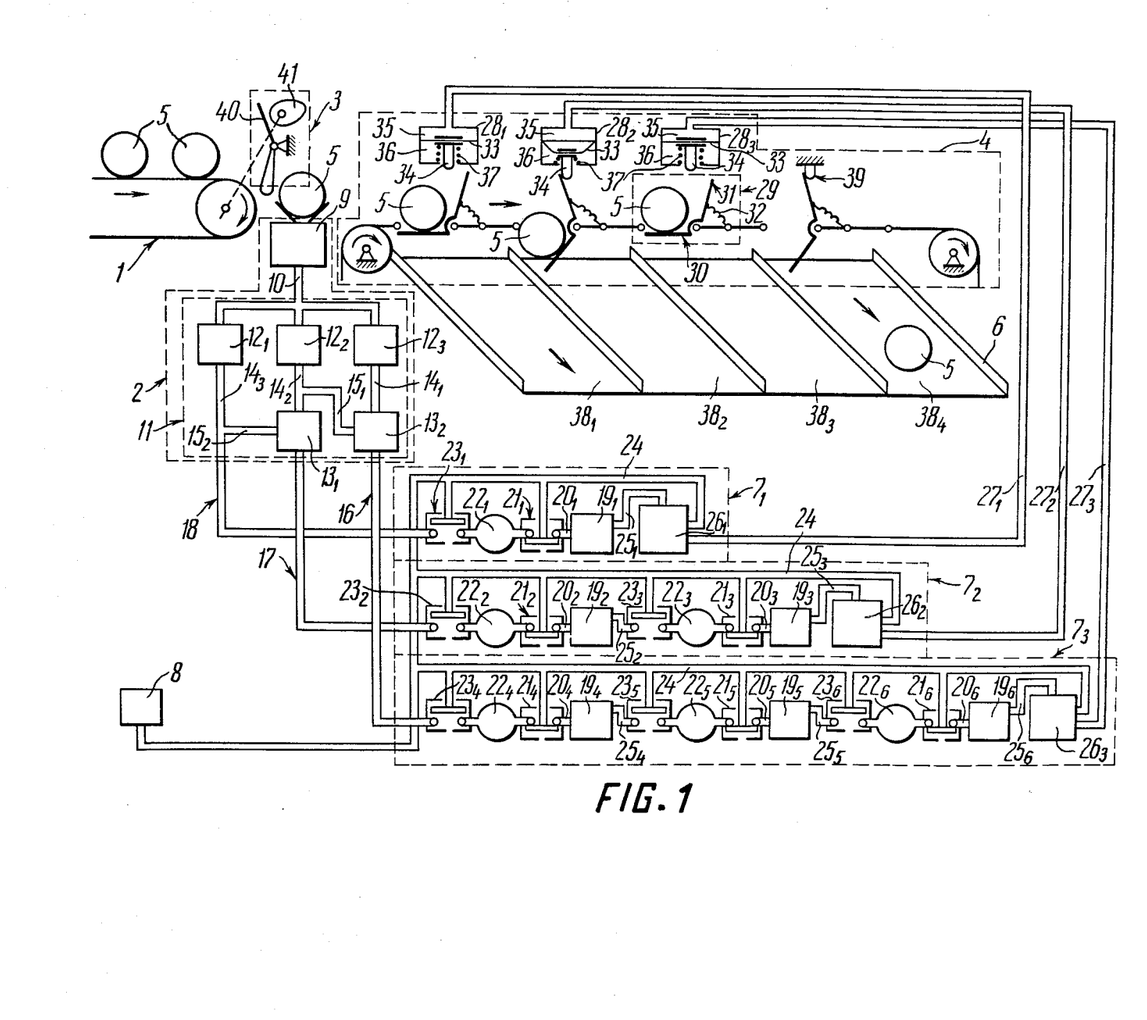
FIG. 1 is a general diagram of system including the automatic machine for weight classifying eggs, according to the invention.

The weighing device 2, constructed to operare pheumatically, consists of the egg weight pick-up 9 with a pneumatic output connected through a common channel 10 to the appliance 11 for determining the weight category of the egg by a single weighing. For he sake of simplicity, the situation being considered is when the incoming flow of eggs 5 is to specify three weight categories of the egg 5, i.e. to divide them according to weight into four categories. The eggs 5 heavier than some pre-determined weight $G_1$ relates to the first one of the specified weight categories, the eggs 5 lighter than the weight $G_1$, but heavier than another pre-determined weight $G_2$, relates to the second specified weight category, and the eggs 5 lighter than $G_2$, but heavier than a certain weight $G_3$, relates to the third specified category, and finally, the eggs 5 whose weight is lower than $G_3$ do not actuate the weighing device 2.

The device 11 for determining the weight category of eggs by a single weighing procedure consists of comparison units $12_1$, $12_2$ and $12_3$ whose number is equal to the number of specified weight categories and negation elements $13_1$ and $13_2$. The comparison units $12_1$, $12_2$ and $12_3$ have different actuation thresholds. The comparison unit $12_1$ has the highest actuation threshold. Each subsequent comparison unit has a lower actuation threshold than the preceding one, and the comparison unit $12_3$ has the lowest actuation threshold. The comparison unit $12_3$ is connected through channel $14_1$ to the negation element $13_2$ which is controlled by the output signal of the comparison unit $12_2$ and is connected through channel $15_1$ to its output channel $14_2$. The comparison unit $12_2$ is connected through channel $14_2$ to the negation element $13_1$ which is controlled by the output signal of the comparison unit $12_1$ and is connected through channel $15_2$ with its output channel $14_3$. Thus, each of the negation elements is controlled from the comparison unit having a higher actuation threshold as compared to the actuation threshold of the comparison unit to which the said negation element is connected.

The weighing device 2 incorporates output channels 16, 17 and 18 whose number is equal to the number of specified weight categories. The output channel 18 is directed connected with the output channel $14_3$ of the comparison unit $12_1$ having the highest actuation threshold. The output channel 17 is connected to the output of the negation element $13_1$, and the output channel 16 is connected to the ouput of the negation channel $13_2$. The output channels 16, 17 and 18 are connected to the inputs of the delay lines $7_3$, $7_2$ and $7_1$ irrespectively controlled from the stroke pulse generator 8. The number of delay lines is equal to the number of specified weight categories. The delay lines $7_1$, $7_2$ and $7_3$ are designed to delay a signal proceeding from the weighing device 2 to one, two or three strokes (pulses) respectively. The duration of the stroke pulse is determined by the rate at which the eggs 5 are supplied by the feeding conveyer 1.

The delay line $7_1$ incorporates a pneumatic relay $19_1$ whose output is connected through channel $20_1$ and the open valve $21_1$ to the pneumatic reservoir $22_1$. The pneumatic reservoir $22_1$ communicates through the closed valve $23_1$ with the output channel 18. The valves $21_1$ and $23_1$ are controlled from stroke pulse generator 8, the valves being connected to the generator through channel 24. The output of the pneumatic relay $19_1$ is connected through channel $25_1$ with a changeover switch $26_1$ constructed to operate pneumatically and connected through channel 24 to the stroke pulse generator 8. The output of the change-over switch $26_1$ is connected to the output chaannel $27_1$ of the delay line $7_1$.

The delay line $7_2$ incorporates two pneumatic relays $19_2$ and $19_3$. The input of the pneumatic relay $19_3$ is connected by channel $20_3$ through the open valve $21_3$ to the pneumatic reservoir $22_3$. The pneumatic reservoir $22_3$ communicates with the output of the pneumatic relay $19_2$ through the closed valve $23_3$ and channel $25_2$. The input of the pheumatic relay $19_2$ is connected to pneumatic reservoir $22_2$ through channel $20_2$ and the open valve $21_2$. The pneumatic reservoir $22_2$ communicates with the output channel 17 through the closed valve $23_2$. The valves $21_2$, $21_3$, $23_2$ and $23_3$ are controlled from the stroke pulse generator 8 and connected with it through channer 24. The output of the pneumatic relay $19_3$ is connected through channel $25_3$ to the change-ove switch $26_2$ constructed to operate pneumatically and connected through channel 24 with the generator 8 of stroke pulses. The output of the change-over switch $26_2$ is connected to the output channel $27_2$ of the delay line $7_2$.

The delay line $7_3$ incorporates three pneumatic relays $19_4$, $19_5$ and $19_6$. The input of the pneumatic relay $19_6$ is connected to the pneumatic reservoir $22_6$ by means of the channel $20_6$ and the open valve $26_6$. The pneumatic reservoir $22_6$ is connected through the closed valve $23_6$ and channel $25_5$ to the output of the pneumatic relay $19_5$. The input of the pneumatic relay $19_5$ is connected through channel $20_5$ and the open valve $21_5$ to the pneumatic reservoir $22_5$. The pneumatic reservoir $22_5$ is connected through the closed valve $23_5$ and the channel $25_4$ to the output of the pneumatic relay $19_4$. The input of the pneumatic relay $19_4$ is connected by the channel $20_4$ through the open valve $21_4$ to the pneumatic reservoir $22_4$. The pneumatic reservoir $22_4$ is connected through the closed valve $23_4$ to the output channel 16. The valves $21_4$, $21_5$, $21_6$, $23_4$, $23_5$ and $23_6$ are controlled from the generator 8 of stroke pulses and are connected with the generator through channel 24. The output of the pneumatic relay $19_6$ is connected by the channel $25_6$ to the change-over switch $26_3$ which is constructed to operate pneumatically and is connected through channel 24 to the stroke pulse generator 8. The output of the change-over switch $26_3$ is connected to the output channel $27_3$ of the delay line $7_3$.

Signal delay lines are constructed similarly if they are designed for a greater number of strokes (pulses), viz. four, five, etc. The number of pneumatic relays in the delay line is equal to the number of strokes for which the line is designed. The number of strokes for which the signal from the outputs of the weighing device should be delayed depends on the choice of where the weight-catagorized egg should be delivered by the distribution conveyer 4.

The output channels $27_1$, $17_2$ and $27_3$ are connected to the relevant control devices $28_1$, $28_2$, $28_3$ of the distribution conveyer 4.

The distribution conveyer 4 consists of series connected cells 29. Each cell 29 includes a receiving cup 30, a lever 31 fastened to the cup, and a spring 32 used to hold the receiving cup 30 in a definite position. A membrane 33 is fixed inside the control device $28_1$, with the centre of the membrane being rigidly connected to the rod 34. The membrane 33 devides the inner cavity of the control device $28_1$ into two chambers 35 and 36. The chamber 35 is connected to the output channel $27_1$ and the chamber 36 communicates with the atmosphere. The membrane 33 is maintained in the upper position by means of the spring 37.

The discharging conveyer 6 is located under the distribution conveyer 4 and has chute units $38_1$, $38_2$, $38_3$ and $38_4$ whose number is equal to the number of flows into which the classified eggs are divided. The units $38_1$, $38_2$ and $38_3$ are designed in a direct to perpendicular direction i.e. laterally the classified eggs of the first, second and third categories respectively, and the unit $38_4$ is designed to side-track the remaining eggs which is effected by stop 39.

The mechanism 3 for transferring eggs 5 incorporates a swivel (pivoted) lever 40 and an interacting cam 41 kinematically (operatively) connected to the feeding conveyor 1 and the distribution conveyer 4.

The weight pick-up 9 (FIG. 2) consists of a swivel lever 42 having one end located over the nozzle 43 and is equipped with a cup 44 for receiving eggs 5, and a power compensation element 45. The element 45 is constructed from two membranes 46 and 47 whose centres are interconnected by a rigid rod 48 which interacts with the swivel lever 42, with the effective area of the membrane 46 being larger than the effective area of the membrane 47. The chamber formed by the membranes 46 and 47 is connected through the common channel 10, and by means of channel 49 — to the nozzle 43 and through the orifice 50 to the power source 51.

The comparison unit $12_1$ (FIG. 3) consists of the selector 52 of the reference signal, the element 53 for comparing the signal arriving from the weight pick-up 9 with the signal arriving from the selector of the reference signal, and the pneumatic relay 54.

The selector 52 of the reference signal has a membrane 55 with a rigid centre which divides the inner cavity of the selector 52 of the reference signal into two chambers 56 and 57. The chamber 57 accommodated a compression spring 58 which acts upon the membrane 55. The chamber 57 communicates through channel 59 with the atmosphere which is marked in FIG. 3 in the same manner as "earth" is designated in electrical diagrams. The chamber 56 incorporates a nozzle 60 connected to the atmosphere. The chamber 56 communicates through the orifice 61 with the power source 51.

Figure 3:
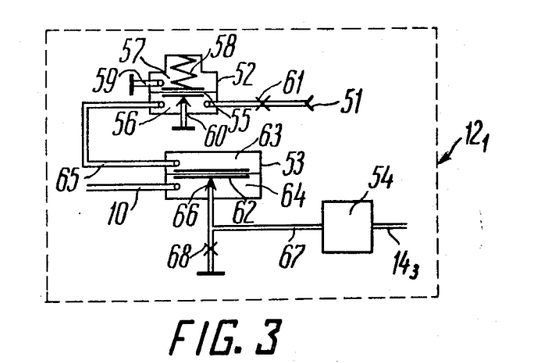
FIG. 3 is a basic diagram of the comparison unit, according to the invention.

The comparison element 53 has a membrane 62 which divides its inner cavity into two chambers 63 and 64. The chamber 63 is connected through channel 65 with the chamber 56 of the selector 52 of the reference signal. Located in the chamber 64 is the nozzle 66 which is connected to the input of the pneumatic relay 54 and the atmosphere by means of channel 67 through the orifice 68. The pneumatic relay 54 is constructed similarly to the pneumatic relay $19_1$.

Let us consider another embodiment of the comparison unit $12_1$.

The comparison unit $12_1$ (FIG. 4) consists of a selector 52 of the reference signal, the element 69 for comparing the signal arriving from the weight pick-up 9 with the signal arriving from the selector 52 of the reference signal, and the pneumatic relay 54. The comparison element 69 has two similar membranes 70 and 71 whose rigid centres are connected with a rigid rod 72. The membranes 70 and 71 divide the inner cavity of the comparison element 69 into three chambers 73, 74 and 75. The chamber 73 is connected through channel 76 to the chamber 56 of the selector 52 of the reference signal. Located in the chamber 74 communicating with the atmosphere is the nozzle 77 which interacts with the membrane 71 and which is connected through channel 78 to the input of the pneumatic relay 54 and through the orifice 79 to the power supply source 51. The comparison units $12_2$ and $12_3$ are similarly constructed as the comparison unit $12_1$.

The negation element $13_1$ (FIG. 5) has three membranes 80, 81 and 82 which divide its inner cavity into four pneumatically isolated chambers 83, 84, 85 and 86. The rigid centres of the membranes 80, 81 and 82 are interconnected by a common rod 87. The effective areas of the membranes 80 and 82 are the same, and the membrane 81 has a larger effective area. The nozzle 88 is located in the chamber 83, and the nozzle 89 is located in the chamber 86 with these nozzles interacting with the rigid centre of the membrane 82. The chamber 83 is connected to the nozzle 89 and the output channel 17 of the weighing device 2, and the nozzle 88 is connected to the output channel $14_2$ of the comparison unit $12_2$. The chamber 84 is constantly supplied with support pressure. Here and subsequently, the chamber that is supplied with support pressure is shaded with cross-sectioning lines. The chamber 85 is the control chamber of the negation element $13_1$ and is connected through channel $15_2$ to the output channel $14_3$ of the comparison unit $12_1$ which controls the negation element $13_1$. The chamber 86 communicates with the atmosphere. The negation element $13_2$ is constructed and connected in the same manner as the negation element $13_1$.

The closed valve $23_1$ (FIG. 6) has two membranes 90 and 91 whose rigid centres are interconnected with a common rod 92. The membrane 90 has a large effective area. The membranes 90 and 91 divide the inner cavity of the closed valve $23_1$ into three chambers 93, 94 and 95. The chamber 93 is supplied with support pressure. The chamber 94 is the control chamber of the closed valve $23_1$. It communicates through channer 24 with the stroke pulse generator 8 (FIG. 1). The nozzle 96 interacting with the rigid centre of the membrane 91 is located in the chamber 95 (FIG. 6), the nozzle being connected to the reservoir $22_1$. The chamber 95 is connected with the output channel 18 of the weighing device 2. All the closed valves mentioned above are constructed in a similar manner.

The open valve $21_1$ (FIG. 7) is of a similar design with as the closed valve $23_1$ (FIG. 6) and contains two membranes 97 and 98 (FIG. 7) whose rigid centres are interconnected by a common rod 99. The chamber 100 of the open valve $21_1$ is supplied with support pressure and the chamber 101 is the control chamber and is connected through channel 24 to the stroke pulse generator 8 (FIG. 1). The chamber 102 (FIG. 7) is connected to the pneumatic reservoir $22_1$, and the nozzle 103 is connected through channel $20_1$ to the input of the pneumatic relay $19_1$. All the open valves mentioned above are constructed in a similar manner.

The pneumatic relay $19_1$ (FIG. 8) is designed similar to the negation element and contains three membranes 104, 105 and 106 whose rigid centres are interconnected by a common rod 107. The chamber 108 of the pneumatic relay $19_1$ is the control chamber and is connected through channel $20_1$ to an open valve $21_1$ (not shown). The chamber 109 is supplied with support pressure and the chamber 110 communicates with the atmosphere. The chamber 111 is connected to the nozzle 112 and through channel $25_1$ — to the change-over switch $26_1$ (FIG. 1). The nozzle 113 (FIG. 8) is connected to the power supply source 51. All the pneumatic relays mentioned here are constructed in a similar manner.

The change-over switch $26_1$ (FIG. 9) is similarly designed with the negation element and it also contains three membranes 114, 115 and 116 whose rigid centres are interconnected by a common rod 117. The chamber 118 of the change-over switch $26_1$ is its control chamber and is connected through channel 24 to the stroke pulse generator 8 (FIG. 1) of, and the chamber 119 (FIG. 9) is supplied with support pressure. The chamber 120 communicates with the atmosphere, and the chamber 121 is connected to the nozzle 122 and to the output channel $27_1$ of the delay line $7_1$ (FIG. 1). The nozzle 123 (FIG. 9) is connected to the output of the pneumatic relay $19_1$ (FIG. 1) by means of channel $25_1$. The change-over switches $26_2$ and $26_3$ are constructed similarly to the change-over switch $26_1$.

OPERATION

The operation of the automatic machine for classifying eggs according to weight categories is accomplished in the following manner;

The feeding conveyer 1 (FIG. 1) aand the mechanism 3 for transferring eggs supply the egg 5 to the weight pick-up 9 in whose common channel 10 a pneumatic signal is formed, the latter being proportional to the weight of the egg. The pneumatic signal proceeds from the weight pick-up 9 along the common channel 10 to the comparison units $12_1$, $12_2$ and $12_3$ of the device 11 for determining by a single weighing the corresponding weight category of the egg where its value is compared with the value of the reference signals to be determined by the limits of the weight categories and specifies the weight category of the egg which is being weighed up. As a result of comparison, a pneumatic signal is fed to the appropriate delay line $7_1$, $7_2$, or $7_3$ connected to the weighing device 2 at whose corresponding output it has appeared.

At the moment of placing the egg 5 onto the weighing device 2, the generator 8 feeds a stroke pulse in the form of a pneumatic signal, whose value is equal, for example, to the pressure of gas of the power supply source 51. In so doing, the valve at the input of the delay line opens admitting the compressed gas to the first pneumatic reservoir of the delay line.

At the end of the egg 5 weighing period, the stroke pulse arriving from the stroke pulse generator 8 is removed, the valve at the input of the delay line is closed, and the gas pressure is retained in the first pneumatic reservoir. Then the transfer mechanism 3 tips over the egg 5 from the weighing device 2 into the cell of the distribution conveyer 4, and the signal disappears in the output channel connected to the said delay line. The delay line ensures the delay of the signal arriving from the weighing device 2 until the egg carried by the distribution conveyor is over the unit belonging to the particular weight category of the discharging conveyer 6 to which the given egg category pertains. The signal from the delay line output is fed to the control device of the distribution conveyor 4. The control device actuates and opens up the cell 29 located beneath which results in tipping the egg 5 into the unit of the discharging conveyor 6 of the corresponding weight category.

If, for example, an egg of the first, i.e. the heaviest, category has been fed to the weight pick-up 9, all the comparison units $12_1$, $12_2$ and $12_3$ are actuated and pneumatic signals appear at their outputs, but since the output channel of each subsequent comparison unit, as fas as the actuation threshold is concerned, is connected to the relevant delay line by means of the negation element, only the conparison $12_1$ will furnish a signal to the output channel 18 connected to the delay line $7_1$.

The delay line $7_1$ is controlled from the pulse generator 8 and delays the signal formed in the output channel 18 for the duration of one stroke of operation of the generator 8. The generator 8 generates stroke pulses synchronised with the movement of the distribution conveyer 4. During the time equal to the duration of one stroke, i.e. during one period of stroke pule alternation, the egg 5 delivered to the distribution conveyer 4 moves from left to right (as is shown in FIG. 1) and takes up a position under the conveyor unit $38_1$ of the first weight category of the discharging conveyor 6. At this time, the next stroke pulse is sent from the generator 8 of stroke pulses, and a pneumatic signal appears in the output chaannel $27_1$. This signals proceeds along the channel $27_1$ to the chamber 35 of the control device $28_1$ and moves out the rod 34. The lever 31 of the moving receiving cup 30 of the cell 29 of the distribution conveyer 4 moves the rod 34, rotating the cup 30, and the egg 5 is tipped off to the unit $38_1$ of the first weight category of the discharging conveyor 6. In the absence of a stroke signal in the output channel $27_1$ of the delay line $7_1$ is removed, the control device $28_1$ and the receiving cup 30 return to the initial position and in so doing the receiving cup 30 occupies the initial position by means of the spring 32.

If an egg of the second weight category has been fed to the weigh at pick-up 9, only the comparison units $12_2$ and $12_3$ actuate. The signal from the comparison unit $12_3$ will not be fed to the output channel 16 of the weighing device 2, since in this case the negation element $13_1$ controlled from the comparison unit $12_2$ will be actuated. The negation element $13_1$ switched on at the output of the comparison unit $12_2$ is open, since there is no signal at the output of the comparison unit $12_1$. Thus, only in the output channel 17 of the weighing device 2 a pneumatic signal will appear. This signal will be fed to the delay line $7_2$ which delays the signal for two stroked of the operation of the stroke pulse generator 8.

During the period equal to the duration of two strokes, the distribution conveyer 4 transfers the egg to the conveyor unit $38_2$ of the second weight category of the discharging conveyor 6. At this moment a signal appears in the channel $27_2$ of the delay line $7_2$ actuating the control device $28_2$. It acts on the lever 31 of the cup 30 of the cell 29 as the distribution conveyer 4 moves as has been described above. The receiving cup 30 rotates and tips off the egg into the conveyor unit $38_2$ of the second weight category of the discharging conveyer 6. In the absence of such a pulse, the signal is removed from the output channel $27_2$ which results in returning the control device $28_2$ and the receiving cup 30 of the distribution conveyor to the initial position.

If an egg of the third weight category has been fed to the weight pick-up 9, the comparison unit $12_3$ alone actuates and since the preceding comparison unit $12_2$ does not actuate, the negation element $13_2$ which is controlled by it is open and the signal from the output of the comparison unit $12_3$ will be fed to the output channel 16 and further on to the signal delay line for delaying the signal for a duration of three strokes.

In the time that the signal is delayed for a duration of three strokes, the distribution conveyer 4 will transfer the egg 5 to the conveyer unit $38_3$ of the third weight category of the discharging conveyer 6. At this moment a pneumatic signal will appear in the output channel $27_3$ of the delay line $7_3$ proceeding to the control devide $28_3$ of the distribution conveyor 4. This will bring about the tipping off the egg 5 into the conveyor unit $38_3$ of the discharging conveyor 6 in the same way as described above.

When and the egg 5 is fed to the weight pick-up 9, the egg being lighter than the value corresponding to the third weight category, none of the comparison units $12_1$, $12_2$ and $12_3$ actuates, and the egg 5 transported by the distribution conveyer 4 is tipped off into the conveyor $38_4$ of the discharging conveyer due to the interaction of the lever 31 of the receiving up 30 with the stop 39.

Figure 2:
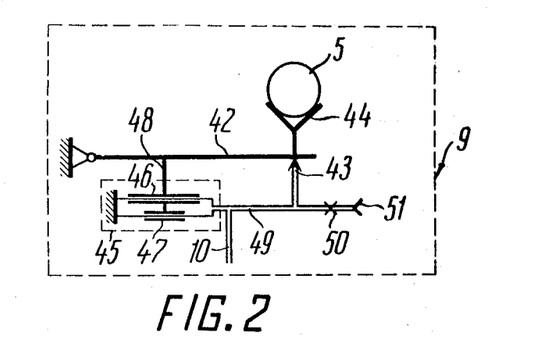
FIG. 2 is a basic diagram of the egg-classifying weight pick-up, according to the invention.

The weight pick-up 9 (FIG. 2) operates in the following manner;

When the egg 5 gets into the up 44, the lever 42 is lowered covering the nozzle 43. As a result, the resistance to gas escape through the nozzle 43 to the atmosphere increases raising the pneumatic pressure in the channel 49. Compressed gas is supplied through the orifice 50 from the power supply source 51. On increasing, the gas pressure in the channel 49, the pressure rises as well in the chamber formed between the membranes 46 and 47 of the power compensation element 45. Since the effective area of the membrane 46 is larger than the effective area of the membrane 47, increase of gas pressure in the channel 49 results in an increase in the effort exerted by the rod 48 on the lever 42 lifting the latter. The covering of the nozzle 43 by the lever 42, and consequently, the pressure increase in the chamber formed between the membranes 46 and 47 of the power compensation element 45 will last until the moment of force to which the lever 42 is subjected by the power compensation element 45 is equal to the moment developed in the opposite direction by weight effort of the egg 5 places in the cup 44 with respect to the turning point of the lever 42. Thus, the gas pressure in the channel 49, and consequently, in the common channel 10 of the weight pick-up 9 will be proportional to the weight of the egg 5 placed in the cup 44 of the weight pick-up 9.

The higher the coefficient of proportionality, the smaller the difference in the effective areas of the membranes 46 and 47 of the power compensation element 45.

The comparison unit $12_1$ (FIG. 3) operates in the following manner;

If the gas pressure in the chamber 64 connected through the common channel 10 with the weight pick-up 9 (FIG. 1) is lower then that in the chamber 63 (FIG. 3) which is connected through channel 65 with the selector 52 of the reference signal; this meaning that the weight of the egg 5 is smaller than that which defines the lower limit of the given weight category at which the comparison unit has been adjusted, the nozzle 66 will be covered by the rigid centre of the membrane 62. Since the channel 67 communicates only with the atmosphere through the orifice 68, the gas pressure at the input of the relay 54 and in the output channel will be equal to atmospheric pressure.

If the gas pressure in the common channel 10, and consequently, in the chamber 64 is higher than that in the chamber 63, this meaning that the weight of the egg to be weighed is larger than the weight which defines the lower limit of the given weight category to which the comparison unit $12_1$ is adjusted, the membrane 62 goes up and opens the nozzle 66. The channel 67 will be connected to the chamber 64 whereof the compressed gas will escape through the nozzle 66 and the orifice 68 to the atmosphere. A gas pressure corresponding to the resistance value of the orifice 68 will set in the channel 67. The gas pressure will trigger the relay 54 and a pneumatic signal will appear at its output and in the output channel $14_3$.

The gas pressure which is compared to the signal originating in the channel 10 if formed by the selector 52 of the reference signal in the following manner;

Pressure from the power supply source 51 through the orifice 61 is fed to the chamber 56 of the selector 52 of the reference signal. The gas that gets to the chamber 56 is let out to the atmosphere through the nozzle 60. A gas pressure that countereffects the effort of the spring 58 exerted on the membrane 55 will be established in the chamber 56. If the gas pressure in the chamber 56 decreases by any reason, the membrane acted upon by the spring 58 will go down covering the nozzle 60. The larger the covered area of the nozzle 60, the greater the resistance to gas escape from the chamber 56 to the atmosphere. This will lead to an increase in gas pressure in the chamber 56. The membrane 55 will continue to go down acted upon by the spring 58 until the increased gas pressure in the chamber 56 equalises the pressure force of the spring 58.

If the gas pressure in the chamber 56 increases by any reason, the membrane 55 will go by uncovering the nozzle 60 to such an extent when the entailed escape of gas to the atmosphere incurs a drop in gas pressure in the chamber 56 to the original value which equalises the pressure force of the spring 58.

Figure 4:
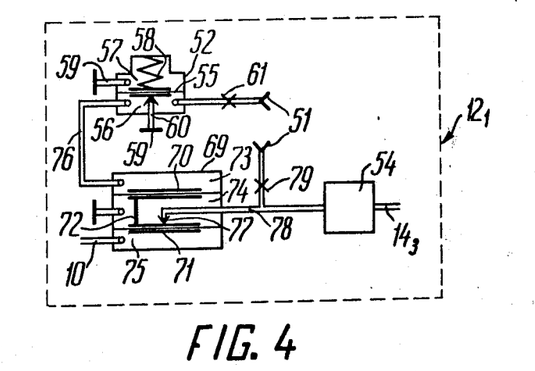
FIG. 4 is a basic diagram of another embodiment of the comparison unit, according to the invention.

The comparison unit $12_1$ constructed as is shown in FIG. 4 operates in the following manner;

If the gas pressure proceeding from the weight pick-up 9 (FIG. 1) along the common channel 10 to the chamber 75 is higher than that which is fed from the selector 52 of the reference signal along the channel 76 to the chamber 73, the membrane 71 will cover the nozzle 77 and disconnect the channel 78 from the chamber 74 and the atmosphere. The pressure of the gas which is fed from the power supply source 51 through the orifice 79 will build up in the channel 78. Since the channel 78 is directly connected to the input of the pneumatic relay 54, the available supply pressure in the channel will actuate the pneumatic relay 54 and a pneumatic signal will appear in the output channel $14_3$.

If the gas pressure in the chamber 75 will be lower than that in the chamber 73, the membranes 70 and 71 rigidly interconnected by the rod 72 will take up the lower position, that is why the nozzle 77 is open. The channel 78 communicates with the chamber 74 and the atmosphere. The gas from the channel 78 escapes freely to the atmosphere and its pressure is close to the atmospheric pressure, therefore there is no pneumatic signal at the input and output of the pneumatic relay 54.

Figure 5:
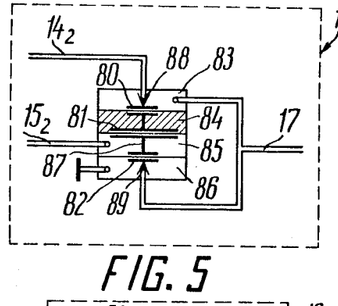
FIG. 5 is a basic diagram of the negation element, according to the invention.

The negation element $13_1$ (FIG. 5) operates in the following manner;

If an egg of the second weight category is weighed up, the comparison units $12_2$ (FIG. 1) and $12_3$ will actuate, and the comparison unit $12_1$ will not actuate, there will be no gas pressure in the channel $15_2$, the common rod 87 which rigidly connects the membranes 80, 81 and 82 will go down under the effect of the support pressure in the chamber 84 and the membrane 82 will cover the nozzle 89, the nozzle 88 will open. In this case the output channel $14_2$ will be connected through the open nozzle 88 to the output channel 17 of the weighing device 2 (FIG. 1). The signal from the comparison unit $12_2$ will be fed to the output channel 17 of the weighing device 2.

If an egg of the first weight category is weighed up, all the comparison units $12_1$, $12_2$ and $12_3$ will actuate, and a pneumatic signal will appear in the channel $15_2$, the value of the signal being larger than the support pressure in the chamber 84 (FIG. 5). As a result, the common rod 87 will go up and the membrane 80 will cover the nozzle 88 disconnecting the output channel $14_2$ from the channel 17, and the nozzle 89 will open connecting the output channel 17 to the chamber 86 which constantly communicates with the atmosphere.

Atmospheric pressure will be established in the output channel 17. In this case the signal from the output channel $14_2$ of the comparison unit $12_2$ (FIG. 1) will not get to the output channel 17 of the weighing device 2.

The negation element $13_2$ operates in a similar manner.

Figure 6:
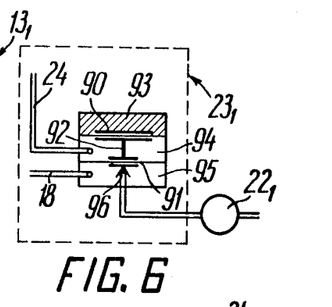
FIG. 6 is a basic diagram of the closed valve, according to the invention.

The closed valve $23_1$ (FIG. 6) operates as follows;

In the absence of the stroke pulse in the channel 24, the common rod 92 acted upon by the support pressure in the chamber 93 will go down and the membrane 91 will cover the nozzle 96 disconnecting the output channel 18 of the weighing device 2 (FIG. 1) from the pneumatic reservoir $22_1$ (FIG. 6). When a stroke pulse whose values exceeds the support pressure in the chamber 93 appears in the channel 24, the common rod 92 goes up and the membrane 91 will open the nozzle 96. The output channel 18 will be connected to the pneumatic reservoir $22_1$.

Figures 7, 8:
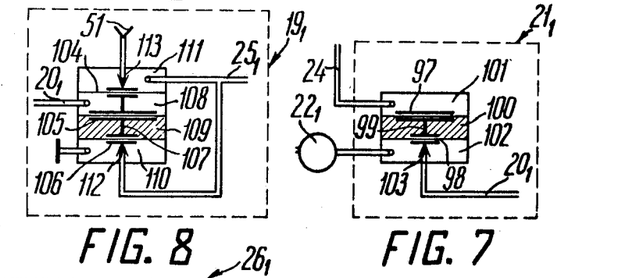
FIG. 7 is a basic diagram of the open valve, according to the invention.
FIG. 8 is a basic diagram of the pneumatic relay, according to the invention.

The open valve $21_1$ (FIG. 7) operates in the following manner;

In the absence of the stroke pulse in the channel 24, the common rod 99 acted upon by the support pressure in the chamber 100 will go up and the membrane 98 will uncover the nozzle 103. In this way the pneumatic reservoir $22_1$ will communicate with the channel $20_1$. When a stroke pulse whose value exceeds the support pressure in the chamber 100 appears in the channel 24, the common rod 99 goes down and the membrane 98 will cover the nozzle 103 disconnecting the pneumatic reservoir $22_1$ from the channel $20_1$.

The pneumatic relay $19_1$ (FIG. 8) operates in the following manner;

In the absence of the stroke pulse in the channel $20_1$ and in the control chamber 108 the common rod 107 acted upon by the support pressure in the chamber 109 goes up since the effective area of the membrane 105 is larger than that of the membrane 106. The membrane 104 therewith covers the nozzle 113, and the membrane 106 opens the nozzle 112. The channel $25_1$ communicates with the atmosphere through the open nozzle 112 and the chamber 110.

If a pneumatic signal whose value exceeds the support pressure in the chamber 109 is fed to the control member 108 via the channel $20_1$, the common rod 107 acted upon by the gas pressure established in the control chamber 108 will move down as the difference of the effective areas of the membranes 105 and 104 is equal to the difference of the effective areas of the membranes 105 and 106. The membrane 106 covers the nozzle 112 and disconnects the channel $25_1$ from the atmosphere, and the membrane 104 opens the nozzle 113 and the compressed gas from the power supply source 51 proceeds to the chamber 111 and the channel $25_1$.

Figure 9:
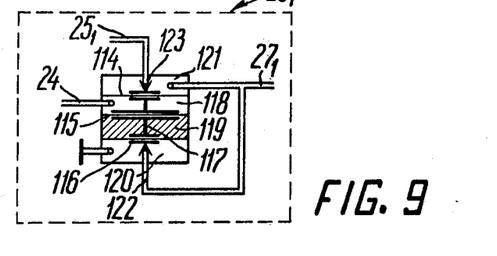
FIG. 9 is a basic diagram of the change-over switch, according to the invention.

The change-over switch $26_1$ (FIG. 9) operates in the following manner:

In the absence of the stroke pulse in the channel 24 and in the control chamber 118 the common rod 117 acted upon by the support pressure in the chamber 119 goes up, with the membrane 114 covering the nozzle 123 and disconnecting the channel $25_1$ from the channel $27_1$, and the membrane 116 opens the nozzle 122 connecting the channel $27_1$ to the chamber 120 and the atmosphere.

When a stroke pulse whose value exceeds the support pressure in the chamber 119 (FIG. 9) is fed from the stroke pulse generator 8 (FIG. 1) through the channel 24 to the chamber 118, the common rod 117 acted upon by the pressure established in the control chamber 118 goes down, with the membrane 116 covering the nozzle 122 and disconnecting the channel $27_1$ from the atmosphere, the membrane 114 uncovers the nozzle 123 and the channel $25_1$ communicates with the channel $27_1$.

The operation principle of the signal delay lines is the same as that of the line $7_3$ (FIG. 1) of delaying signals for a duration of three strokes.

When an egg of the third weight category is weighed, a pneumatic signal appears in the output channel 16 of the weighing device 2. At this time, the generator 8 of stroke pulses feeds channel 24 with a stroke pulse which will be referred to as the first signal, which opens up the closed valve $23_4$ and communicates the output channel 16 with the pneumatic reservoir $22_4$, the open valve $21_4$ opens at the same time and disconnects the pneumatic reservoir $22_4$ from the input channel $20_4$ of the pneumatic relay $19_4$. A gas pressure of the same value as that of the output channel 16 is established in the pneumatic reservoir $22_4$.

At the end of weighing the egg 5, the gas pressure in the channel 24 is removed, i.e. the stroke pulse disappears. As this takes place, the valve $23_4$ closes and disconnects the pneumatic reservoir $22_4$ from the channel 16, and the valve $21_4$ opens and connects the pneumatic reservoir $22_4$ through the channel $20_4$ to the input of the pneumatic relay $19_4$. The compressed gas from the pneumatic reservoir $22_4$ is fed to the control chamber of the relay $19_4$. This entails the actuation of the relay $19_4$ and the appearance of a pneumatic signal at its output and in the channel $25_4$. Thus, the signal at the output of the relay $19_4$ appears one half-stroke period after the appearance of the signal in the channel 16.

The valve $23_4$ closes and concurrently the valve $23_5$ closes too, disconnecting therefore the channel $25_4$ from the pneumatic reservoir $21_5$ and the compressed gas does not pass to the pneumatic reservoir $22_5$.

When the second stroke pulse is stroke pulse generated by the generator 8, the valves $23_4$, $23_5$ and $23_6$ open and the valves $21_4$, $21_5$ and $21_6$ close.

The valve $21_4$ disconnects the channel $20_4$ and the pneumatic reservoir $22_4$. Gas pressure is maintained at the input and output of the pneumatic relay $19_4$, and passing along the channel $25_4$, the compressed gas fills up the pneumatic reservoir $22_5$. At the same time the pneumatic reservoir $22_4$ is connected to the output channel 16 of the weighing device 2. If the next egg 5 to be weighed up does not belong to the third weight category, the output channel 16 as well as the pneumatic reservoir $22_4$ will be connected to the atmosphere. When the second stroke pulse disappears, i.e. the gas pressure in the channel 24 is equal to the atmospheric pressure, the valves $23_4$, $23_5$ and $23_6$ close, and the valves $21_4$, $21_5$ and $21_6$ open with the pneumatic reservoir $22_5$ being connected to the channel $20_5$ and the input of the pneumatic relay $19_5$. As a result, the pneumatic relay $19_5$ actuates and the gas pressure in the channel $25_5$ is equal to the supply pressure. The channel $20_4$ and the input of the pneumatic relay $19_4$ are connected to the pneumatic reservoir $22_4$ wherein the gas pressure is equal to the atmospheric pressure. As a result, the gas pressure in the channel $20_4$ and at the input of the pneumatic realty $19_4$ will be close to the atmospheric pressure and the pneumatic signal at its output will disappear.

When the third stroke pulse is issued from the stroke pulse generator 8, the valves $23_4$, $23_5$ and $23_6$ open and the valves $21_4$, $21_5$ and $21_6$ close. The valve $21_5$ disconnects the channel $20_5$ from the pneumatic reservoir $22_5$. Gas pressure at the input and output of the pneumatic relay remains unchanged and the compressed gas passing along the channel $25_5$ fills up the pneumatic reservoir $22_6$. When the third stroke pulse disappears, i.e. the gas pressure in the channel 24 is equal to the atmospheric pressure, the valves $23_4$, $23_5$ and $23_6$ will close and the valves $21_4$, $21_5$ and $21_6$ will open, with the pneumatic reservoir $22_6$ being connected to the channel $20_6$ and the input of the pneumatic relay $19_6$. As a result, the pneumatic relay $19_6$ will actuate and the gas pressure in the channel $25_6$ will be equal to the supply pressure. The compressed gas from channel $25_6$ does not pass to the output channel $27_3$ of the delay line $7_3$, for in the absence of a stroke pulse in the channel 24 the change-over switch $26_3$ disconnects the channel $25_6$ from the output channel $27_3$ of the delay line $7_3$.

When the fourth stroke pulse appears in the channel 24 the valve $21_6$ disconnects the channel $20_5$ from the pneumatic reservoir $22_6$. Gas pressure at the input and output of the pneumatic relay $19_6$ remains unchanged, the change-over switch $26_3$ connects the channel $25_6$ to the output channel $27_3$, that is why a pneumatic signal appears in the latter.

So the pneumatic signal is fed to the input of the line $7_3$ during the first stroke pulse, and to the output channel $27_3$ — during the fourth stroke pulse, i.e. after a period of three strokes.

While removing the fourth stroke pulse the change-over switch returns to the initial position connecting the output channel $27_3$ of the delay line $7_3$ to the atmosphere and disconnecting it from the channel $25_6$.

The lines $7_1$ and $7_2$ of delaying signals for a period of one or two strokes operate in a similar way.

The automatic machine of the invention for weight classifying eggs makes it possible to provide parallel operation of several automatic machines of this kind to enhance the productivity of classifying eggs.

The considered automatic machine for classifying eggs according to weight categories has the following advantages as compared to the machines of prior art:

The single weighing makes it possible to eliminate the multiple transfer of the egg to the weighing devices thus reducing considerably the probability of breaking eggs;

The design of the automatic machine makes it possible to arrange several machines of this kind for parallel operation;

The productivity of the machine per one row does not depend on the number of rows, whereas with the known machines for classifying eggs according to weight categories, the increase in the number of rows entails a reduction of the productivity per one row due to a longer route of tranferring eggs; It is possible to construct an automatic machine with a six-row charge whose productivity is more than twice as large as that of the known machines with a six-row charge.

The employed design of the distribution and discharging conveyers enable the dimensions and weight to be reduced;

The application of the pneumatic system for controlling the process of classifying eggs and the utilisation of a pneumatic weight pick-up make it possible to step up the reliability of the automatic machine, to simplify its design and maintenance;

No mechanisms of reciprocating motion are utilised in the automatic machine, therefore the egg developes minimal speeds and accelerations in the process of movement; and The adjustment of the automatic machine in the course of operation is reduced to the adjustment of the selectors of the reference signals.

What is claimed is:

1. In a system for automatically classifying eggs according to the weight thereof, including apparatus comprising:

feed conveyer means for transporting eggs to be classified;

weighing means disposed to receive eggs from said feed conveyor means for individually weighing the eggs and determining the weight category of each egg with respect to a plurality of predetermined possible weight categories, said weighing means being provided with a separate output line and means for generating a pneumatic signal for each said weight category, a pneumatic signal being generated on one of said output lines upon each weighing;

distributor conveyer means for receiving the eggs from said weighing means, said distribution conveyer means including a plurality of spaced apart egg-discharge gate means disposed along said conveyer means in the direction of travel thereof, each said gate means including means actuable by a control means therefor in response to a pneumatic signal for releasing an egg from the gate;

stroke pulse generator means for generating a train of pneumatic timing pulses in which the interpulse spacing of said pulse train is integrally related to the distance between each discharge gate means of said distribution conveyer means at a given rate of feed of the conveyer means;

a plurality of delay lined each comprising a pneumatic counter means for counting a respectively different number of timing pulses from said stroke pulses generator means, each delay line delaying the transfer of a pneumatic signal applied thereto for a time interval defined by said respective number of timing pulses, each delay line being operatively connected between a respective output line of said weighing means and a respective control means for an egg-discharge gate means.

2. In a system as set forth in claim 1 wherein the said weighing means for determining the appropriate weight category comprises a plurality of pneumatic comparison units equal in number to the number of the specified weight categories; means for selecting pneumatic reference signals determined by the limits of the weight categories and which are operative connected to each of the said respective comparison units; comparison elements operatively connected to each of the said respective comparison units which compare the pneumatic signal arriving from the said weighing means with the pneumatic signals coming from the said means for selecting the reference signals pneumatic relays operatively connected to each of the said respective comparison units; the said comparison units including means having different actuation thresholds, a first comparison unit having the highest actuation threshold and each subsequent unit having a lower actuation threshold than the preceding one; means for combining the inputs of the said comparison units in a common fluid channel said common fluid channel being connected to an output of the said weighing means; output channels of the weighing means equal in number to the number of the specified weight categories; pneumatic negation elements; the output of the said comparison unit with the highest actuation threshold being directly connected to a corresponding output channel of the said weighing means, said pneumatic negation elements being operatively connected to the outputs of the remaining said comparison units, said negation elements each operatively connected to and being controlled by an output signal of the preceding comparison unit, the outputs of the said negation elements being operatively connected to the output channel of the said weighing means.

3. In a system as set forth in claim 1 wherein each of the said delay lines comprises pneumatic relays equal in number to the number of pulses of delaying signals emenating from the said weighing means; pneumatic reservoirs each operatively connected to the input of the said pneumatic relays for communicating it with the output of a preceding pneumatic relay, and the first of the said pneumatic relays of the said delay lines with a relevant output channel of the said weighing means; pneumatic valves operatively connected to and controlled by the said pulse generator stroke means, the valves being connected to the input and output of each of the said pneumatic reservoirs; and change-over switch operatively connected to and controlled by said stroke generator pulse means and connected to the output of the last pneumatic relay of the said delay lines, and output channel connected to the said change-over switch and communicating through the change-over switch with the atmosphere in the absence of a pulse signal.

4. In a system as set forth in claim 1 wherein the said distribution conveyer means comprises, series, connected cells each including means to receive eggs, each of the cells including a respective control means for receiving a pneumatic signal from the delay line and means to dislodge an egg to the appropriate egg-discharging means of the distribution conveyer means.

5. In a system as set forth in claim 1 including a discharging conveyer means disposed transversely to the distribution conveyer means for ensuring that the classified eggs are side-tracked from the flow of eggs being fed to the said weighing means.

6. In a system as set forth in claim 2 wherein said weighing means comprises a pivoted lever, a nozzle over which one end of the said swivel lever is located and a power compensation element; said power compensation element consisting of two membranes having different effective areas, and a rigid rod interconnecting the said membranes and operatively connected with the pivoted lever; and fluid channel connecting a chamber formed by said membranes to the said nozzle and the output of the said weighing means.

7. In a system as set forth in claim 2 wherein each of the said comparison elements includes a membrane which divides in inner cavity into two chambers; a nozzle installed in one of the said chambers and which interacts with the said membrane; the said nozzle being operatively connected to the pneumatic relay cooperating with the comparison unit and its cooperating comparison element; an orifice communicating the nozzle with the atmosphere; the one chamber which accommodates the said nozzle and which is being connected to the output of the said weighing means; the other chamber being connected to the said means for selecting the reference signal, the means for selecting a reference signal being operatively connected to the comparison unit and its comparison element.

8. In a system as set forth in claim 2 wherein each of the said comparison elements includes two similar membranes forming three chambers; a rigid rod connecting the said membranes; a nozzle operatively connected to a first chamber defined between the said membranes, the nozzle interacting with one of the said membranes; the said nozzle being operatively connected to a pneumatic relay and its corresponding comparison unit and its comparison element; an orifice connecting the said nozzle to a pneumatic power supply source; and second chamber formed by the membranes interacting with the said nozzle being operatively connected to the output of the said weighing means; the first chamber communicating with the atmosphere; the third chamber being operatively connected to the means for selecting a reference signal and its corresponding comparison unit and comparison element.

* * * * *